(12) United States Patent
Wu et al.

(10) Patent No.: US 11,662,652 B2
(45) Date of Patent: May 30, 2023

(54) PROJECTOR AND LENS ADJUSTMENT MODULE

(71) Applicant: Coretronic Corporation, Hsin-Chu (TW)

(72) Inventors: Chun-Hsien Wu, Hsin-Chu (TW);
Chih-Hui Chang, Hsin-Chu (TW);
Fu-Shun Kao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 101 days.

(21) Appl. No.: 17/233,562

(22) Filed: Apr. 19, 2021

(65) Prior Publication Data

US 2021/0397073 A1 Dec. 23, 2021

(30) Foreign Application Priority Data

Jun. 19, 2020 (CN) .......................... 202010563946.4

(51) Int. Cl.
*G03B 21/14* (2006.01)
*G02B 7/02* (2021.01)
*G02B 13/16* (2006.01)

(52) U.S. Cl.
CPC ............. *G03B 21/142* (2013.01); *G02B 7/02* (2013.01); *G02B 13/16* (2013.01)

(58) Field of Classification Search
CPC ........ H04N 9/28; H04N 9/312; H04N 9/3135; H04N 9/3141; H04N 9/3152; G02B 7/003;

(Continued)

(56) References Cited

U.S. PATENT DOCUMENTS 10,466,575 B1 11/2019 Chen et al.
2005/0024596 A1* 2/2005 Kuroda .................... G03B 5/04
353/34

(Continued)

FOREIGN PATENT DOCUMENTS

CN 101373242 2/2009
CN 101750717 6/2010

(Continued)

OTHER PUBLICATIONS

"Office Action of China Counterpart Application", dated Jul. 1, 2022, p. 1-p. 10.

*Primary Examiner* — Sultan Chowdhury
(74) *Attorney, Agent, or Firm* — JCIPRNET (57) ABSTRACT

A projector, including a body, a light source, a light valve, a projection lens, and a lens adjustment module, is provided. The light source and the light valve are disposed in the body, and the projection lens is movably disposed on the body. The lens adjustment module includes a driven structure connected to the projection lens, a guiding member and a rotating member connected to the guiding member. The guiding member is disposed on the body to be rotatable along an axis of rotation and has a closed ring guiding rail. The driven structure is slidably disposed at the closed ring guiding rail and is configured to move relative to the guiding member along a closed ring path defined by the closed ring guiding rail. A normal direction of a surface where the closed ring path is located is not parallel to the axis of rotation.

18 Claims, 8 Drawing Sheets

(58) Field of Classification Search
CPC .......... G02B 7/02; G02B 7/022; G02B 7/026; G02B 7/16; G02B 13/16; G02B 13/18; G02B 13/22; G03B 21/14; G03B 21/43; G03B 21/142; G03B 21/145; G03B 21/321; G03B 21/323
See application file for complete search history.

(56) References Cited

U.S. PATENT DOCUMENTS

| | | | | |
|---|---|---|---|---|
| 2007/0052935 | A1* | 3/2007 | Nakamura | G03B 5/02 353/101 |
| 2009/0185145 | A1* | 7/2009 | Kitahara | G03B 21/005 353/101 |
| 2011/0001940 | A1* | 1/2011 | Kuroda | G03B 21/142 359/813 |
| 2012/0285280 | A1* | 11/2012 | Chang | F16M 11/046 74/411 |
| 2017/0010522 | A1 | 1/2017 | Shen et al. | |
| 2020/0033706 | A1* | 1/2020 | Iinuma | H04N 9/3141 |

FOREIGN PATENT DOCUMENTS

| | | |
|---|---|---|
| CN | 101995742 | 3/2011 |
| CN | 102129160 | 7/2011 |
| CN | 102540654 | 8/2014 |
| CN | 102540385 | 1/2016 |
| CN | 107092154 | 8/2017 |
| CN | 208367297 | 1/2019 |
| TW | M283208 | 12/2005 |

* cited by examiner

PROJECTOR AND LENS ADJUSTMENT MODULE

CROSS-REFERENCE TO RELATED APPLICATION

This application claims the priority benefit of China application serial no. 202010563946.4, filed on Jun. 19, 2020. The entirety of the above-mentioned patent application is hereby incorporated by reference herein and made a part of this specification.

BACKGROUND

Technical Field

This disclosure relates to a display device and an adjustment module, and in particular, to a projector and its lens adjustment module.

Description of Related Art

A projector is a display device configured to generate an image anytime and anywhere. The imaging principle of the projector is to convert an illumination beam generated by a light source into an image beam by a light valve, and then project the image beam through a projection lens onto a screen or a wall to form an image. With the advancement of projection technology and the reduction in manufacturing costs, the use of projectors has gradually expanded from commercial usage to home usage.

In some projectors, a knob is used to adjust the rise or fall of the projection lens in order to allow a user to change the height of the projected image. In this adjustment method, with the knob screwed to the projection lens, the rise or fall of the projection lens can be driven by the rotation of the knob. When the projection lens rises or falls with the rotation of the knob until it comes into contact with a stop structure (for example, a position-limiting screw configured to limit the rise or fall of the projection lens), the interference between the projection lens and the stop structure, and the applied force of the knob tend to lead to deformation of the casing structure of the projection lens. This causes the screwing between the knob and the projection lens to be too tight and not easy to reverse. In addition, the deformation of the casing structure will cause the angle or position of the projection lens to deviate from the normal state and affect the picture quality, or even lead to the damage of the structure of the projection lens.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

This disclosure provides a projector and its lens adjustment module, which can avoid deformation of a casing structure of a projection lens.

Other objectives and advantages of the disclosure may be further understood from the technical features disclosed in the disclosure.

In order to achieve one, some, or all of the above objectives or other objectives, an embodiment of the disclosure provides a projector, including a body, a light source, a light valve, a projection lens, and a lens adjustment module. The light source is disposed in the body and is configured to provide an illumination beam. The light valve is disposed in the body and is configured to convert the illumination beam into an image beam. The projection lens is movably disposed on the body and is configured to project the image beam. The lens adjustment module includes a driven structure, a guiding member and a rotating member. The driven structure is connected to the projection lens. The guiding member is disposed on the body to be rotatable around an axis of rotation. The guiding member has a closed ring guiding rail, and the driven structure is slidably disposed at the closed ring guiding rail so that the driven structure is moved relative to the guiding member around a closed ring path defined by the closed ring guiding rail. A normal direction of a surface where the closed ring path is located is not parallel to the axis of rotation. The rotating member is connected to the guiding member. When the rotating member rotates and drives the guiding member to continuously rotate in a single rotational direction around the axis of rotation, the driven structure and the projection lens are moved back and forth along a direction parallel to the axis of rotation under the guidance of the guiding member.

In order to achieve one, some, or all of the above objectives or other objectives, an embodiment of the disclosure provides a lens adjustment module applicable to a projector. The lens adjustment module includes a driven structure, a guiding member and a rotating member. The driven structure is connected to a projection lens of the projector. The guiding member is disposed on a body of the projector to be rotatable around an axis of rotation. The guiding member has a closed ring guiding rail, and the driven structure is slidably disposed on the closed ring guiding rail so that the driven structure is moved relative to the guiding member around a closed ring path defined by the closed ring guiding rail. A normal direction of a surface where the closed ring path is located is not parallel to the axis of rotation. The rotating member is connected to the guiding member. When the rotating member rotates and drives the guiding member to continuously rotate in a single rotational direction around the axis of rotation, the driven structure and the projection lens are moved back and forth along a direction parallel to the axis of rotation under the guidance of the guiding member.

Based on the above, the embodiments of the disclosure have at least one of the following advantages or effects. In the lens adjustment module of the disclosure, the guiding member guides the movement of the driven structure and the projection lens through its closed ring guiding rail. The closed ring guiding rail is disposed to be inclined to the axis of rotation of the guiding member, so that the projection lens may rise or fall along a direction parallel to the axis of rotation under the guidance of the guiding member. Since the closed ring guiding rail is a continuous closed guiding rail, after the driven structure reaches the lowest point of the closed ring guiding rail with the rotation of the guiding member, the driven structure is then able to start moving toward the highest point of the closed ring guiding rail with the continuous rotation of the guiding member. Similarly, after the driven structure reaches the highest point of the closed ring guiding rail with the rotation of the guiding member, the driven structure is then able to start moving toward the lowest point of the closed ring guiding rail with the continuous rotation of the guiding member. In other words, with the continuous rotation of the guiding member around the single rotational direction, the driven structure will move back and forth between the lowest point and the highest point of the closed ring guiding rail, and will not excessively transfer the applied force to the casing structure of the projection lens at the lowest point or the highest point due to continuous application of force by the user, thereby preventing stressing and deformation of the casing structure of the projection lens. In addition, the guiding member and the driven structure have simple structures instead of complicated configurations, and there is no need to choose a more expensive metal, such as magnesium alloy, to be used as a high-strength material of the casing structure of the projection lens in order to overcome the deformation issue, thereby saving the manufacturing cost of the projector.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

In the following detailed description of the exemplary embodiments, reference is made to the accompanying drawings which form a part hereof, and in which are shown by way of illustration specific embodiments in which the disclosure may be practiced. In this regard, directional terminology, such as "top", "bottom", "left", "right", "front", "back", etc., is used with reference to the orientation of the figure(s) being described. The components of the disclosure may be positioned in a number of different orientations. As such, the directional terminology is used for purposes of illustration and is in no way limiting.

On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting.

Terms such as "including", "comprising", or "having", and variations thereof herein is meant to encompass the items listed thereafter and equivalents thereof as well as additional items. Unless limited otherwise, the terms "connected", "coupled", "mounted", and variations thereof herein are used broadly and encompass direct and indirect connections, couplings, and mountings.

Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
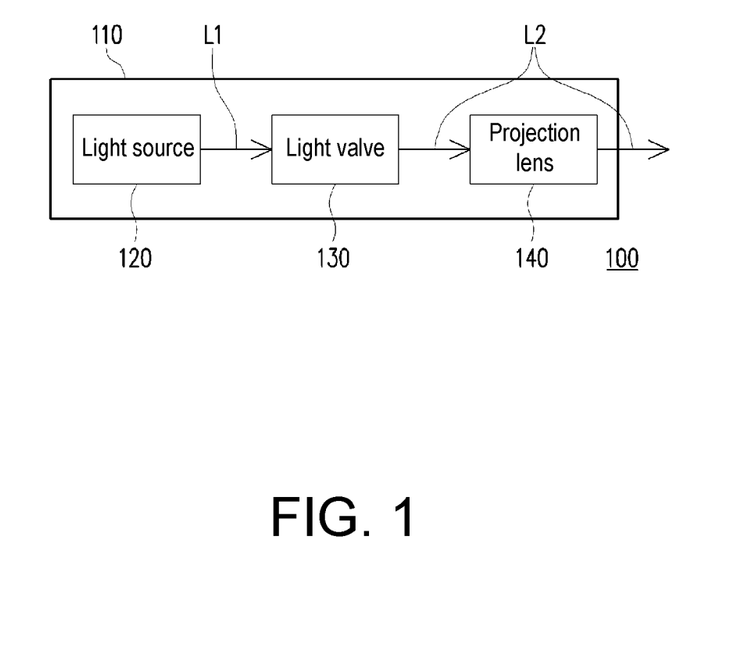
FIG. 1 is a schematic view of a projector according to an embodiment of the disclosure.

FIG. 1 is a schematic view of a projector according to an embodiment of the disclosure. With reference to FIG. 1, a projector 100 according to the embodiment includes a body 110, a light source 120, a light valve 130, and a projection lens 140. The light source 120 is disposed in the body 110 and is configured to provide an illumination beam L1. The light valve 130 is, for example, a digital micromirror device (DMD), and is disposed in the body 110 to convert the illumination beam L1 into an image beam L2. In other embodiments, the light valve 130 may also be a reflective light modulator such as a liquid crystal on silicon panel (LCoS panel), or may also be a transmissive light modulator such as a transparent liquid crystal panel, an electro-optic modulator, a magneto-optic modulator, and an acousto-optic modulator (AOM). The projection lens 140 is disposed on the body 110 and is configured to project the image beam L2. The projection lens 140 includes, for example, a combination of one or more optical lenses with diopters, such as various combinations of non-flat surface lenses such as a biconcave lens, a biconvex lens, a meniscus lens, a convex-concave lens, a plano-convex lens, and a plano-concave lens. In other embodiments, the projection lens 140 may also include a flat surface optical lens, and projects the image beam L2 to the projection target in a reflective manner. The disclosure does not limit the forms and types of the projection lens 140.

Figure 2:
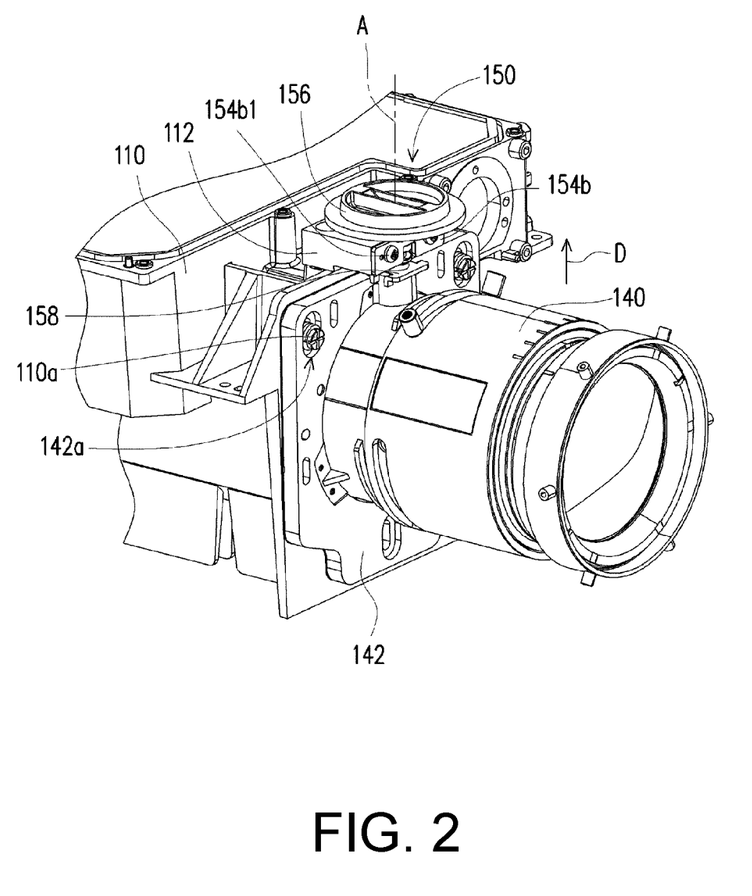
FIG. 2 is a perspective view of a partial structure of the projector shown in FIG. 1.
Figure 3:
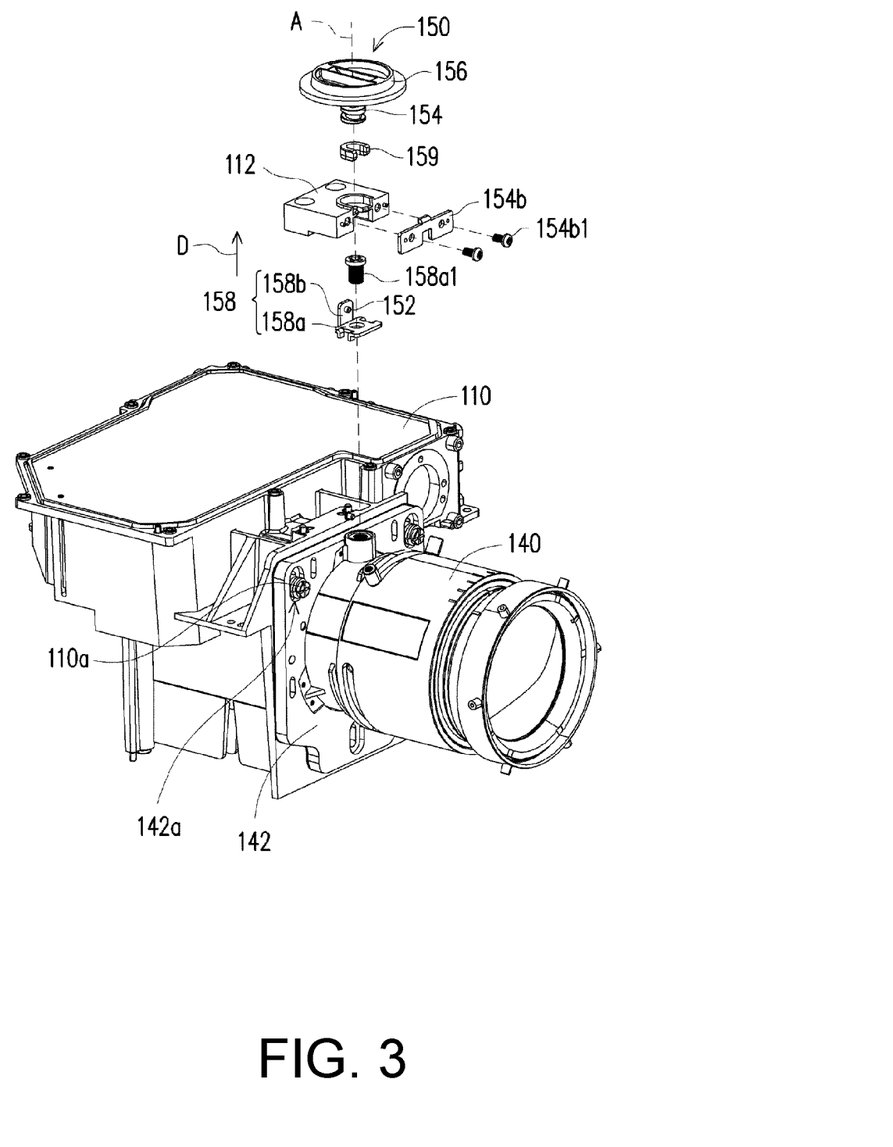
FIG. 3 is an exploded view of the projector shown in FIG. 2.

FIG. 2 is a perspective view of a partial structure of the projector shown in FIG. 1. FIG. 3 is an exploded view of the projector shown in FIG. 2. With reference to FIGS. 2 and 3, a casing structure 142 of the projection lens 140 of the embodiment is, for example, a plastic carrier plate, which has multiple sliding grooves 142a, and multiple position-limiting screws 110a respectively pass through the sliding grooves 142a to screw lock (locked through the screw thread) on the body 110, so that the projection lens 140 is movably disposed on the body 110 along a direction D. The projector 100 also includes a lens adjustment module 150. The lens adjustment module 150 includes a driven structure 152, a guiding member 154, a rotating member 156 and an assembly member 158.

Figure 4:
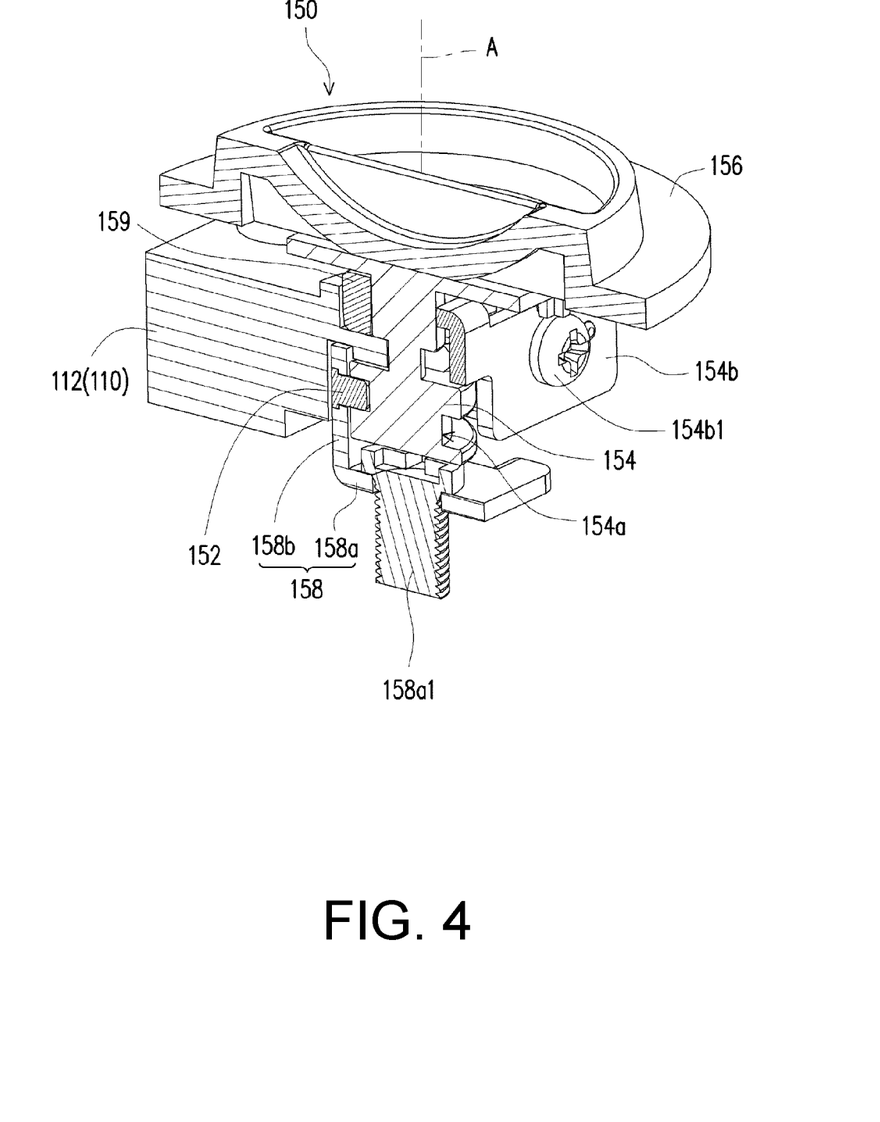
FIG. 4 illustrates a cross-sectional view of a local structure of the projector shown in FIG. 2.
Figure 5:
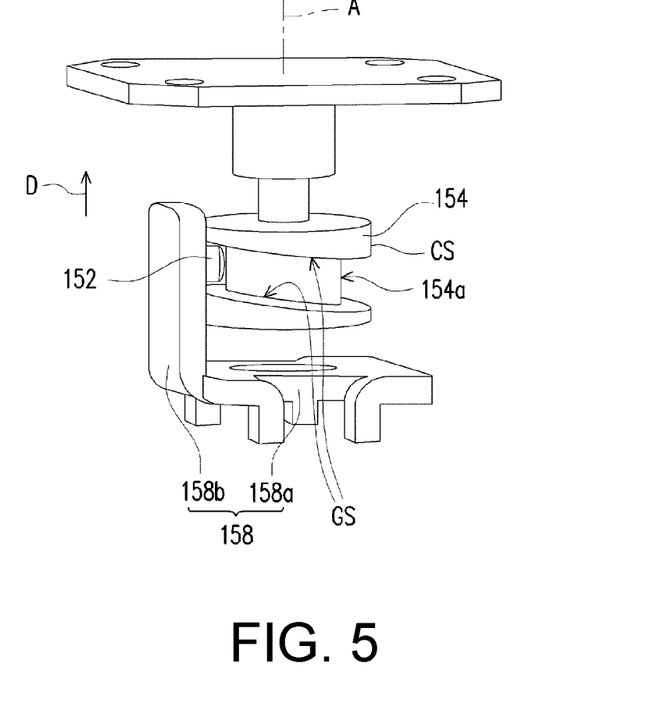
FIG. 5 is a perspective view of the guiding member, the driven structure and the assembly member shown in FIG. 3.

FIG. 4 illustrates a cross-sectional view of a local structure of the projector shown in FIG. 2. FIG. 5 is a perspective view of the guiding member, the driven structure and the assembly member shown in FIG. 3. With reference to FIGS. 2 to 5, the assembly member 158 is assembled on the projection lens 140, and the driven structure 152 is formed on the assembly member 158. In detail, the assembly member 158 is, for example, a sheet metal piece and includes an assembly portion 158a and an extension portion 158b connected to each other. The assembly portion 158a is assembled on the projection lens 140 by a locking screw 158a1, and the extension portion 158b extends from the assembly portion 158a toward the guiding member 154 along a direction parallel to an axis A of rotation. The driven structure 152 is formed as one-piece or not as one-piece on the extension portion 158b and is connected to the projection lens 140 through the assembly member 158. In other embodiments, the driven structure 152 and the assembly member 158 may be connected as one-piece to the projection lens 140, and the disclosure is not limited thereto. The guiding member 154 is disposed on a base 112 of the body 110 to be rotatable around the axis A of rotation, and the guiding member 154 has a cylindrical surface CS centered on the axis A of rotation and a closed ring guiding rail 154a formed on the cylindrical surface CS. The guiding member 154 is, for example, limited to the base 112 by a frame body 154b. The frame body 154b is, for example, a sheet metal member and is screw locked to the base 112 by a locking screw 154b1. In other embodiments, the guiding member 154 may be rotatably disposed on the body 110 in other suitable manners, and the disclosure is not limited thereto. The rotating member 156 is, for example, a knob and is connected to the guiding member 154. The lens adjustment module 150 may further include a bushing 159. The bushing 159 is, for example, a polyoxymethylene (POM) bushing and is sleeved on the guiding member 154 to avoid excessive wearing in the guiding member 154 and its surrounding structure.

Figure 6:
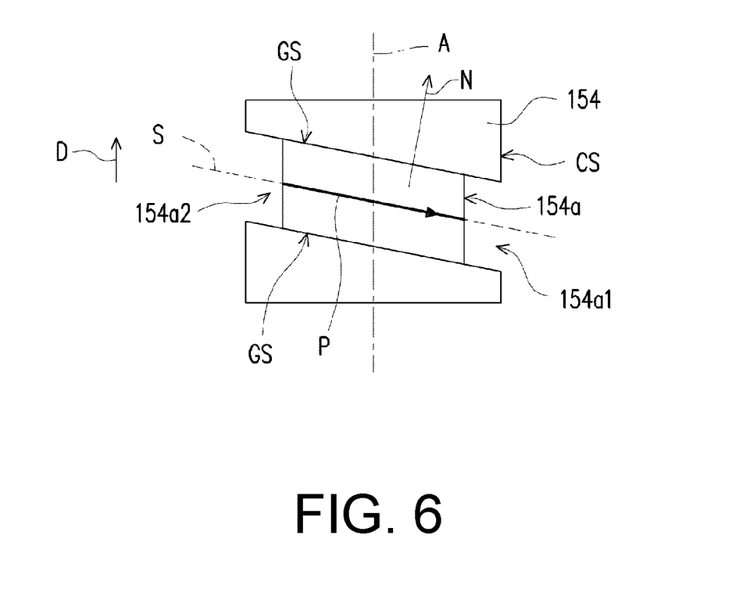
FIG. 6 is a schematic side view of the guiding member shown in FIG. 5.
Figure 7:
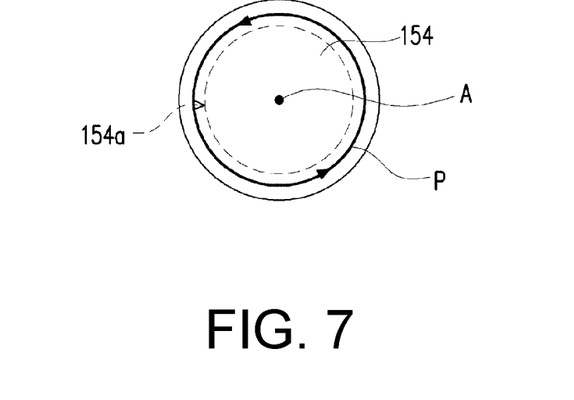
FIG. 7 is a schematic top view of the guiding member shown in FIG. 6.

FIG. 6 is a schematic side view of the guiding member shown in FIG. 5. FIG. 7 is a schematic top view of the guiding member shown in FIG. 6. With reference to FIGS. 5 to 7, the driven structure 152 is slidably disposed at the closed ring guiding rail 154a of the guiding member 154, so that the driven structure 152 is moved relative to the guiding member 154 around a closed ring path P defined by the closed ring guiding rail 154a. A normal direction N of a surface S where the closed ring path P is located is not parallel to the axis A of rotation; that is, the closed ring guiding rail 154a is disposed to be inclined to the axis A of rotation. When the rotating member 156 is rotated by an applied force of an user to drive the guiding member 154 to continuously rotate in a single rotational direction around the axis A of rotation, the driven structure 152 and the projection lens 140 connected to the driven structure 152 (as shown in FIGS. 2 and 3) are moved back and forth along the direction D parallel to the axis A of rotation and a reverse direction of the direction D under the guidance of the guiding member 154.

By configuring the closed ring guiding rail 154a of the guiding member 154 to be inclined to the axis A of rotation of the guiding member 154 as described above, the projection lens 140 (as shown in FIGS. 2 and 3) may rise or fall along the direction D parallel to the axis A of rotation and the reverse direction of the direction D under the guidance of the guiding member 154. Since the closed ring guiding rail 154a is a continuous closed guiding rail, after the driven structure 152 reaches a lowest point 154a1 (as labeled in FIG. 6) of the closed ring guiding rail 154a with the rotation of the guiding member 154, the driven structure 152 then starts moving toward a highest point 154a2 (as labeled in FIG. 6) of the closed ring guiding rail 154a with the continuous rotation of the guiding member 154. Similarly, after the driven structure 152 reaches the highest point 154a2 of the closed ring guiding rail 154a with the rotation of the guiding member 154, the driven structure 152 then starts moving toward the lowest point 154a1 of the closed ring guiding rail 154a with the continuous rotation of the guiding member 154. In other words, with the continuous rotation of the guiding member 154 around the single rotational direction, the driven structure 152 will move back and forth between the lowest point 154a1 and the highest point 154a2 of the closed ring guiding rail 154a, and will not excessively transfer the applied force to the casing structure 142 (as shown in FIGS. 2 and 3) of the projection lens 140 at the lowest point 154a1 or the highest point 154a2 due to the continuous application of force by the user, thereby preventing stressing and deformation of the casing structure 142 of the projection lens 140. In addition, the guiding member 154 and the driven structure 152 have simple structures instead of complicated configurations, and there is no need to choose a more expensive metal, such as magnesium alloy, to be used as a high-strength material of the casing structure 142 of the projection lens 140 in order to overcome the deformation issue, thereby saving the manufacturing cost of the projector 100.

In detail, the guiding member 154 is configured to rotate 180 degrees in the single rotational direction to drive the driven structure 152 to move from a first position (that is, the lowest point 154a1) to a second position (that is, the highest point 154a2) along the direction D parallel to the axis A of rotation, and then is configured to continue to rotate 180 degrees in the single rotational direction to drive the driven structure 152 to move from the second position (that is, the highest point 154a2) to the first position (that is, the lowest point 154a1) along the reverse direction of the direction D, thereby accomplishing the above back-and-forth movement.

In the embodiment, the driven structure 152 is, for example, a bump, and the closed ring guiding rail 154a is correspondingly a closed ring guiding groove, which has two opposing circular guiding surfaces GS (labeled in FIGS. 5 and 6) on an inner side thereof. The two circular guiding surfaces GS are configured to guide the driven structure 152 to rise or fall. A normal direction N of each of the circular guiding surfaces GS is the normal direction N of the surface S and is not parallel to the axis A of rotation. The disclosure does not limit the forms of the driven structure and the closed ring guiding rail, which will be exemplified below with reference to the drawings.

Figure 8:
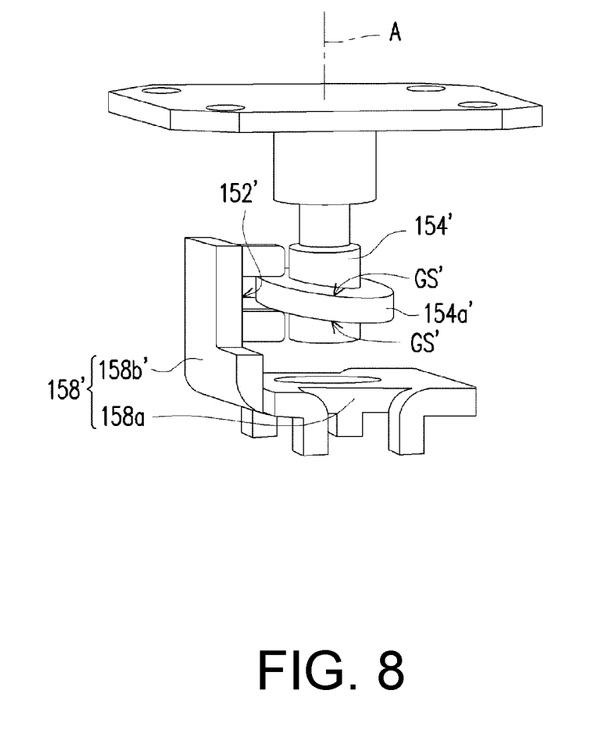
FIG. 8 is a perspective view of a guiding member, a driven structure, and an assembly member according to another embodiment of the disclosure.

FIG. 8 is a perspective view of a guiding member, a driven structure, and an assembly member according to another embodiment of the disclosure. In the embodiment shown in FIG. 8, a driven structure 152' is a groove, which is formed on an extension portion 158b' of an assembly member 158'. A closed ring guiding rail 154a' of a guiding member 154' is correspondingly a closed ring flange, and two circular guiding surfaces GS' on an outer side thereof are configured to guide the rise or fall of the driven structure 152'. In other embodiments, the driven structure and the closed ring guiding rail may be other suitable forms of structures, and the disclosure is not limited thereto.

In other embodiments, a deceleration gear assembly or an acceleration gear assembly may be used to change the rotational speed ratio of the rotating member 156 to the guiding member 154, which will be exemplified below with reference to the drawings.

Figure 9:
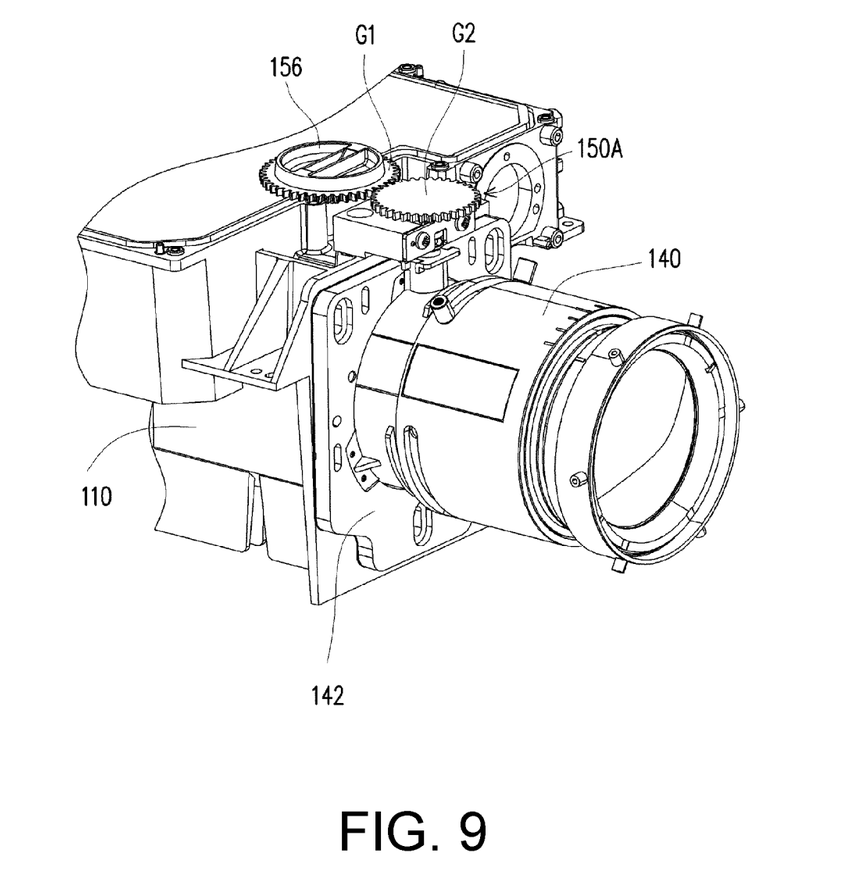
FIG. 9 is a perspective view of a partial structure of a projector according to another embodiment of the disclosure.

FIG. 9 is a perspective view of a partial structure of a projector according to another embodiment of the disclosure. The configuration and operation of a lens adjustment module 150A shown in FIG. 9 are similar to the configuration and operation of the lens adjustment module 150 in the foregoing embodiments, and details are not reiterated herein. A difference between the lens adjustment module 150A and the lens adjustment module 150 is that the rotating member 156 is coaxially connected to a first gear G1 and may be rotatably disposed on the body 110 in an appropriate manner, and a guiding member (such as the guiding member 154 in the foregoing embodiments) is coaxially connected to a second gear G2. The radius of the second gear G2 is smaller than the radius of the first gear G1, so that the first gear G1 and the second gear G2 form an acceleration gear assembly in the lens adjustment module 150A, and the rotating member 156 is connected to the guiding member by the acceleration gear assembly. When compared with the embodiment shown in FIG. 2, with the configuration of the acceleration gear assembly of FIG. 9, the rotating member 156 may drive the projection lens 140 to generate an expected displacement by a smaller amount of rotation. In this way, the user may adjust the position of the projection lens 140 with less effort.

Figure 10:
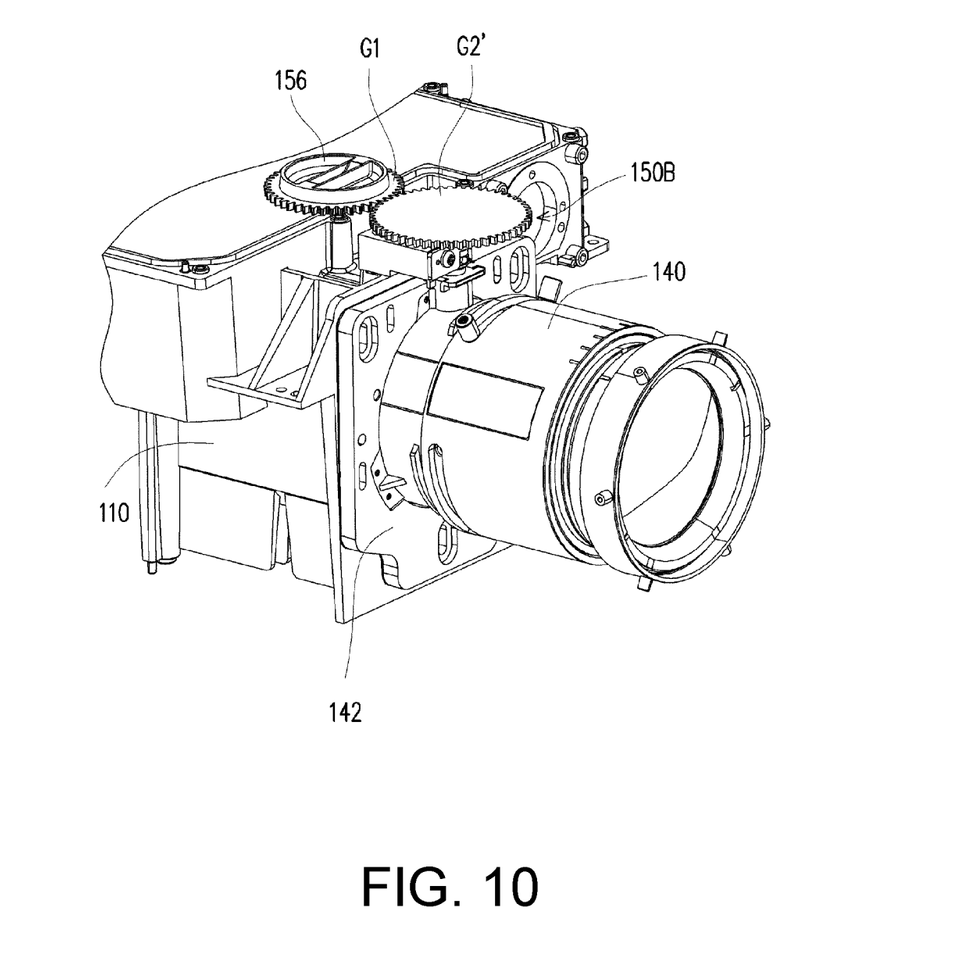
FIG. 10 is a perspective view of a partial structure of a projector according to another embodiment of the disclosure.

FIG. 10 is a perspective view of a partial structure of a projector according to another embodiment of the disclosure. The configuration and operation of a lens adjustment module 150B in FIG. 10 are similar to the configuration and operation of the lens adjustment module 150 in the foregoing embodiments, and details are not reiterated herein. A difference between the lens adjustment module 150B and the lens adjustment module 150 is that the rotating member 156 is coaxially connected to a first gear G1 and may be rotatably disposed on the body 110 in an appropriate manner, and a guiding member (such as the guiding member 154 in the foregoing embodiments) is coaxially connected to a second gear G2'. The radius of the second gear G2' is larger than the radius of the first gear G1, so that the first gear G1 and the second gear G2' form a deceleration gear assembly in the lens adjustment module 150B, and the rotating member 156 is connected to the guiding member by the deceleration gear assembly. When compared with the embodiment shown in FIG. 2, with the configuration of the deceleration gear assembly of FIG. 10, the rotating member 156 may drive the projection lens 140 to generate the expected displacement by a larger amount of rotation. In this way, the user may adjust the position of the projection lens 140 more precisely.

In summary, the embodiments of the disclosure have at least one of the following advantages or effects. In the lens adjustment module of the disclosure, the guiding member guides the movement of the driven structure and the projection lens through its closed ring guiding rail. The closed ring guiding rail is disposed to be inclined to the axis of rotation of the guiding member, so that the projection lens may rise or fall along a direction parallel to the axis of rotation under the guidance of the guiding member. Since the closed ring guiding rail is a continuous closed guiding rail, after the driven structure reaches the lowest point of the closed ring guiding rail with the rotation of the guiding member, the driven structure is then able to start moving toward the highest point of the closed ring guiding rail with the continuous rotation of the guiding member. Similarly, after the driven structure reaches the highest point of the closed ring guiding rail with the rotation of the guiding member, the driven structure is then able to start moving toward the lowest point of the closed ring guiding rail with the continuous rotation of the guiding member. In other words, with the continuous rotation of the guiding member around the single rotational direction, the driven structure will move back and forth between the lowest point and the highest point of the closed ring guiding rail, and will not excessively transfer the applied force to the casing structure of the projection lens at the lowest point or the highest point due to the continuous application of force by the user, thereby preventing stressing and deformation of the casing structure of the projection lens. In addition, the guiding member and the driven structure have simple structures instead of complicated configurations, and there is no need to choose a more expensive metal, such as magnesium alloy, to be used as a high-strength material of the casing structure of the projection lens in order to overcome the deformation issue, thereby saving the manufacturing cost of the projector.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the disclosure", "the invention" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Furthermore, the terms such as "first" and "second" mentioned in this specification or the appended claims are used to name different elements or to distinguish between different embodiments or ranges, and are not intended to limit the upper or lower limit of the number of elements. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projector, comprising a body, a light source, a light valve, a projection lens, and a lens adjustment module, wherein
the light source is disposed in the body and configured to provide an illumination beam,
the light valve is disposed in the body and configured to convert the illumination beam into an image beam,
the projection lens is movably disposed on the body and configured to project the image beam, and
the lens adjustment module comprises a driven structure, a guiding member and a rotating member, wherein
the driven structure is connected to the projection lens,
the guiding member is disposed on the body to be rotatable around an axis of rotation, wherein the guiding member has a ring guiding rail, and the driven structure is slidably disposed at the ring guiding rail so that the driven structure is moved relative to the guiding member along a ring path defined by the ring guiding rail, wherein a normal direction of a surface where the ring path is located is not parallel to the axis of rotation, and
the rotating member is connected to the guiding member, wherein when the rotating member rotates and drives the guiding member to continuously rotate in a single rotational direction around the axis of rotation, the driven structure and the projection lens are moved back and forth along a direction parallel to the axis of rotation under the guidance of the guiding member, wherein the guiding member has a cylindrical surface centered on the axis of rotation, and the ring guiding rail is formed on the cylindrical surface.

2. The projector according to claim 1, wherein the driven structure is a bump, and the ring guiding rail is a ring guiding groove.

3. The projector according to claim 1, wherein the driven structure is a groove, and the ring guiding rail is a ring flange.

4. The projector according to claim 1, wherein the ring guiding rail has two opposing circular guiding surfaces, and a normal direction of each of the circular guiding surfaces is not parallel to the axis of rotation.

5. The projector according to claim 1, wherein the guiding member is configured to rotate 180 degrees in the single rotational direction to drive the driven structure to move from a first position to a second position along the direction parallel to the axis of rotation, and then configured to continue to rotate 180 degrees in the single rotational direction to drive the driven structure to move from the second position to the first position along the direction parallel to the axis of rotation.

6. The projector according to claim 1, wherein the lens adjustment module comprises an assembly member, the assembly member is assembled on the projection lens, and the driven structure is formed on the assembly member.

7. The projector according to claim 6, wherein the assembly member comprises an assembly portion and an extension portion, the assembly portion is assembled on the projection lens, the extension portion extends from the assembly portion toward the guiding member along a direction parallel to the axis of rotation, and the driven structure is formed on the extension portion.

8. The projector according to claim 1, wherein the lens adjustment module comprises a deceleration gear assembly, and the rotating member is connected to the guiding member by the deceleration gear assembly.

9. The projector according to claim 1, wherein the lens adjustment module comprises an acceleration gear assembly, and the rotating member is connected to the guiding member by the acceleration gear assembly.

10. A lens adjustment module applicable to a projector, the lens adjustment module comprising a driven structure, a guiding member and a rotating member, wherein
the driven structure is configured to connect to a projection lens of the projector,
the guiding member is configured to be disposed on a body of the projector to be rotatable around an axis of rotation, wherein the guiding member has a ring guiding rail, and the driven structure is slidably disposed at the ring guiding rail so that the driven structure is moved relative to the guiding member along a ring path defined by the ring guiding rail, wherein a normal direction of a surface where the ring path is located is not parallel to the axis of rotation, and
the rotating member is connected to the guiding member, wherein when the rotating member rotates and drives the guiding member to continuously rotate in a single rotational direction around the axis of rotation, the driven structure and the projection lens are moved back and forth along a direction parallel to the axis of rotation under the guidance of the guiding member, wherein the guiding member has a cylindrical surface centered on the axis of rotation, and the ring guiding rail is formed on the cylindrical surface.

11. The lens adjustment module according to claim 10, wherein the driven structure is a bump, and the ring guiding rail is a ring guiding groove.

12. The lens adjustment module according to claim 10, wherein the driven structure is a groove, and the ring guiding rail is a ring flange.

13. The lens adjustment module according to claim 10, wherein the ring guiding rail has two opposing circular guiding surfaces, and a normal direction of each of the circular guiding surfaces is not parallel to the axis of rotation.

14. The lens adjustment module according to claim 10, wherein the guiding member is configured to rotate 180 degrees in the single rotational direction to drive the driven structure to move from a first position to a second position along the direction parallel to the axis of rotation, and then configured to continue to rotate 180 degrees in the single rotational direction to drive the driven structure to move from the second position to the first position along the direction parallel to the axis of rotation.

15. The lens adjustment module according to claim 10, further comprising an assembly member, wherein the assembly member is assembled on the projection lens, and the driven structure is formed on the assembly member.

16. The lens adjustment module according to claim 15, wherein the assembly member comprises an assembly portion and an extension portion, the assembly portion is assembled on the projection lens, the extension portion extends from the assembly portion toward the guiding member along a direction parallel to the axis of rotation, and the driven structure is formed on the extension portion.

17. The lens adjustment module according to claim 10, further comprising a deceleration gear assembly, wherein the rotating member is connected to the guiding member by the deceleration gear assembly.

18. The lens adjustment module according to claim 10, further comprising an acceleration gear assembly, wherein the rotating member is connected to the guiding member by the acceleration gear assembly.

\* \* \* \* \*